June 16, 1936.  J. A. STEVENSON  2,044,262
GARDEN CULTIVATOR
Filed Oct. 11, 1935
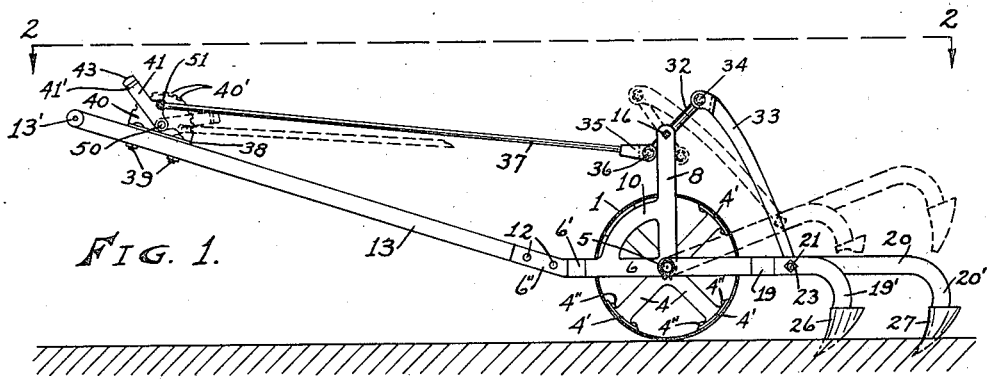
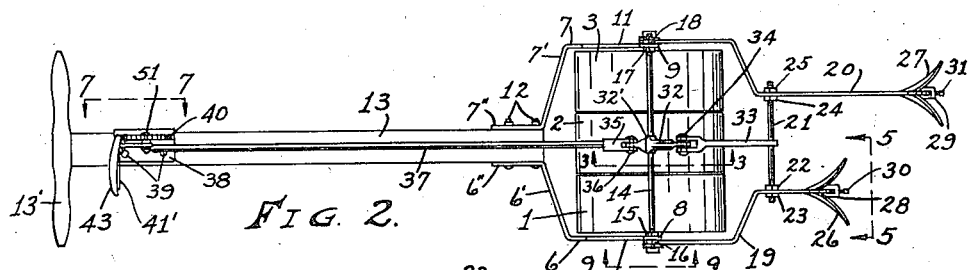
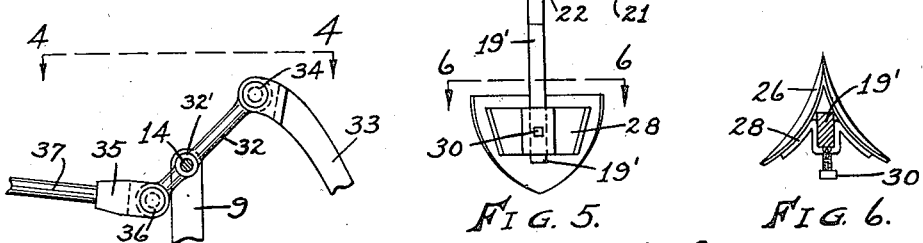
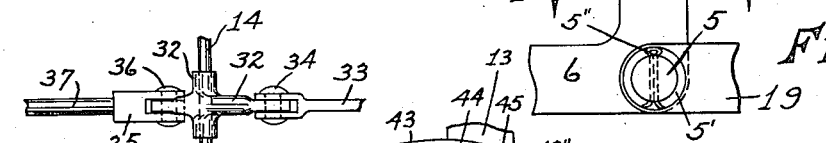
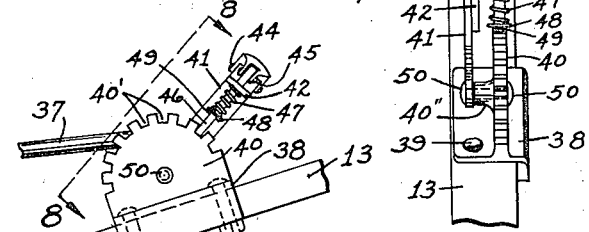
Inventor;
JAMES A. STEVENSON:
By Robert W. Randle, and
Donald E. Windle
Attorneys.

Patented June 16, 1936

2,044,262

UNITED STATES PATENT OFFICE 2,044,262

GARDEN CULTIVATOR

James A. Stevenson, Hamilton, Ohio

Application October 11, 1935, Serial No. 44,475

3 Claims. (Cl. 97—59)

This invention relates to garden cultivators which are used primarily for conditioning the soil for planting, and the principal object of my invention is the provision of a cultivator which is efficient in its operation.

Another object of the invention is the provision of a cultivator which is simple of construction, which is economical to manufacture, and which is comprised of a minimum number of parts.

Other objects and advantages of my invention will suggest themselves in the course of the following description, and that which is new will be correlated in the appended claims.

The preferred means for carrying out the principles of my invention in a practical, efficient, and comprehensive manner is shown in the accompanying one sheet of drawing, in which—

Figure 1 is a side elevation of the cultivator.

Figure 2 is a top plan view of the cultivator, taken from line 2—2 of Figure 1.

Figure 3 is a detail section taken on line 3—3 of Figure 2.

Figure 4 is a plan view taken from line 4—4 of Figure 3.

Figure 5 is a rear elevation of one of the shovel members, taken from line 5—5 of Figure 2.

Figure 6 is a detail section taken on line 6—6 of Figure 5.

Figure 7 is a side elevation of the adjusting means taken from line 7—7 of Figure 2.

Figure 8 is a detail view of the adjusting means taken from line 8—8 of Figure 7.

Figure 9 is a detail elevation taken from line 9—9 of Figure 2.

Figure 10 is a detail section taken on line 10—10 of Figure 9.

Similar indices designate like parts throughout the several views.

In order to make the details and the construction of my invention more clear, I will now take up a detailed description thereof and set forth the same as fully and as comprehensively as I may, but it is to be understood that the construction which I show and describe may be slightly modified without departing from the spirit of the invention.

The numerals 1, 2, and 3 designate sections of the roller members of the device, the same being preferably formed of heavy gauge metal formed circular in shape, as shown in Figure 1. Each of the rollers 1, 2, and 3 has spokes 4, the same extending inwardly from the inside surface of the respective rollers and converge forming a hub portion through which the axle or shaft 5 extends. The portions 4' are formed integrally with the outer ends of the spokes 4 and are secured through the respective rollers by means of the rivets 4", or by other suitable means.

6 and 7 designate the horizontal side frame members which have apertures formed therethrough, and through which the end portions of the shaft 5 extend. 6' and 7' designate forwardly and inwardly extensions of the members 6 and 7 respectively, the same being turned forwardly and thereby forming the portions 6" and 7" respectively. Each of the portions 6" and 7" have apertures formed therethrough for the reception of the bolts 12. The handle shaft 13 extends forwardly from between the forwardly extending portions 6" and 7" and is secured therebetween by means of the bolts 12. The handle 13' is rigidly secured to the forward end of the handle shaft 13 by any well known means.

8 and 9 designate the upwardly extending members which are formed integrally with and at right angles to the members 6 and 7 respectively, the same having apertures formed through the upper portions thereof for the reception of the tie rod 14. The numerals 10 and 11 designate the segmental members extending from the members 6 and 7 to the members 8 and 9 respectively and which are formed integrally therewith.

14 designates the tie rod extending between the upper ends of the members 8 and 9 with the end portions thereof being threaded and extending through the apertures formed in the upper ends of the members 8 and 9. The tie rod 14 is rigidly secured through the member 8 by means of the threaded nuts 15 and 16, and is rigidly secured through the member 9 by means of the threaded nuts 17 and 18.

Extending rearwardly from the shaft 5, and pivotally secured thereon, are the beam members 19 and 20 with the rear portion of each being turned downwardly and forming the portions 19' and 20' respectively. The spacer rod 21 extends between the beam members 19 and 20 and is threaded at each end thereof with the threaded portions extending through the respective beam members 19 and 20. One end of the spacer rod 21 is rigidly secured through the member 19 by means of the threaded nuts 22 and 23 with the opposite end thereof being rigidly secured through the member 20 by means of the threaded nuts 24 and 25.

The members 6, 7, 19, and 20 are secured on their respective ends of the shaft 5 by means of the washers 5' and the cotters 5".

The shovels 26 and 27 are secured to the lower ends of the portions 19' and 20' by means of the U-shaped straps 28 and 29 respectively and the threaded set screws 30 and 31 respectively. The lower end portions of the beam members 19' and 20' extend downwardly into the spaces formed by the straps 28 and 29 respectively and are rigidly secured therein by means of the threaded set screws 30 and 31 respectively.

The rocker arm 32 is pivotally positioned on the tie rod 14 substantially midway between the upwardly projecting members 8 and 9. The rocker arm 32 has apertures formed through its upper and lower ends for the reception of the rivets 34 and 36 respectively. The lifting bar 33 has a yoke portion formed at the upper end thereof which is adapted to receive the upper end portion of the rocker arm 32. The yoke portion has apertures formed therethrough registering with the aperture formed through the upper end of the rocker arm 32 through which the rivet 34 extends and thereby providing a pivoted joint between the members 32 and 33. An aperture is formed through the lower end portion of the lifting bar 33 and through which the spacer rod 21 extends and providing a pivoted joint between the lower end of the lifting bar 33 and the spacer rod 21.

The adjusting rod 37 extends forwardly from the lower end of the rocker arm 32 and is pivotally connected therewith by means of the yoke portion 35 and the rivet 36.

The base member 38, of the adjusting mechanism, has apertures formed therethrough and through which the bolts 39 extend thereby rigidly securing the base member 38 to the handle shaft 13. The semicircular-shaped member 40 extends upwardly from the base member 38 and has the notches 40' formed in the periphery thereof. The member 40 has the projecting portion 40'' formed integrally therewith, the same being concentrically located with relation to the periphery of the member 40 and has an aperture formed therethrough for the reception of the rivet 50. The lever member 41 has an aperture formed through the lower end thereof through which the same is pivotally secured to the portion 40'' by means of the rivet 50. The upper end of the lever 41 is turned at right angles to the major portion thereof and forms the portion 41'. An angle 42 is welded or otherwise suitably secured to the lever member 41, and has an aperture formed through the outstanding leg thereof for the reception of the pawl-rod 46.

The handle member 43 is formed of sheet metal and has the portions 43' formed integrally therewith and is pivotally secured to the lever member 41 by means of the rivet 44. The handle member 43 also has the portions 43'' formed integrally therewith through which the same is pivotally connected to the upper end of the pawl-rod 46 by means of the rivet 45. The pawl-rod 46 extends downwardly from the handle member 43 through the aperture formed through the outstanding leg of the angle bracket 42 with its lower end being adapted to engage the notches 40'. The pawl-rod 46 is forced downwardly by means of the compression spring 47 bearing at its upper end against the under side of the outstanding leg of the angle bracket 42. The lower end of the compression spring 47 bears against the washer 48 which is supported by means of the cotter 49 extending through an aperture formed through the pawl-rod 46. The forward end of the adjusting rod 37 is pivotally secured to the lever member 41 by means of the rivet 51.

The operation or utilization of my cultivator is substantially as follows—

The cultivator is adapted to be pulled over the soil which has previously been plowed. The rollers 1, 2, and 3 break clods which have remained intact and the shovels 26 and 27 stir the soil after the rollers have passed over the same. When it is desired to set the shovels deeper in the soil, the lever 41 is moved forwardly, after releasing the pawl-rod 46 from the notches 40' by means of the handle member 43, thereby exerting a pull on the adjusting rod 37 and the lower end of the rocker arm 32 and forcing the opposite end of the rocker arm 32 rearwardly and downwardly and exerting pressure downwardly on the beam members 19 and 20 through the members 33 and 21. When it is desired to raise the shovels out of the soil the lever member is moved rearwardly and the above-described movements of the parts are reversed, thereby raising the shovels to the desired height, as shown by the dotted lines in Figure 1.

Having now fully described and shown the several parts of the cultivator and the operations thereof, what I claim and desire to secure by Letters Patent of the United States, is—

1. In a cultivator having a plurality of rollers revolvably mounted on a central shaft, frame members having the rear ends thereof mounted on and carried by said shaft, said frame members extending forwardly from the central shaft with their forward ends rigidly secured to a handle shaft, a beam member pivotally secured on each end of the central shaft and extending rearwardly therefrom, a spacer rod rigidly secured through each of said beam members and maintaining the same in spaced relation with each other, a shovel rigidly secured to the rear end of each of said beam members, and means for imparting upward and downward movements to said shovels with relation to the central shaft and the rollers.

2. In a cultivator having a central shaft supported and carried by a plurality of ground rollers, a frame member secured on each end of the central shaft with the forward end thereof being rigidly secured to a handle shaft, rearwardly extending beam members pivotally secured on each end of the central shaft with shovels rigidly secured to the rear ends thereof, a spacer rod rigidly secured at each of its ends through the beam members, upright members formed integrally with the rear ends of the frame members, a tie rod rigidly secured at each end thereof through one of said upright members, a rock arm pivotally mounted on said tie rod, a lifting bar having a yoke formed at its upper end and pivotally secured therethrough to one end of said rocker arm and having its lower end pivotally connected to said spacer rod, an anjusting rod pivotally secured to the opposite end of the rocker arm, and means for imparting forward and rearward movements to said adjusting rod.

3. A cultivator comprising in combination, a central shaft, rollers mounted on said shaft and revolvable therearound, forwardly extending frame members supported at their rear ends by said central shaft and with their forward ends secured to the rear end of a handle shaft, vertical members extending upwardly from the rear ends of said frame members with the upper ends thereof held in spaced relation with each other by a tie rod, beam members pivotally secured on the end portions of said central shaft, said beam members extending rearwardly from said shaft with the ends thereof extending downwardly, a shovel rigidly secured to each of the downwardly extending portions of the beam members, a spacer rod extending between said beam members and rigidly secured therethrough, a rocker arm pivotally positioned on said tie rod with a lifting bar connecting the upper end of the rocker arm and the spacer rod, and means for imparting movement to said rocker arm whereby the beams and shovels are raised and lowered.

JAMES A. STEVENSON.